United States Patent [19]

Keritsis

[11] 4,253,929

[45] Mar. 3, 1981

[54] METHOD FOR DENITRATION OF TOBACCO EMPLOYING ELECTRODIALYSIS

[75] Inventor: Gus D. Keritsis, Richmond, Va.

[73] Assignee: Philip Morris Incorporated, New York, N.Y.

[21] Appl. No.: 127,479

[22] Filed: Mar. 5, 1980

[51] Int. Cl.³ .............................................. B01D 13/02
[52] U.S. Cl. ................................ 204/180 P; 204/301; 131/143
[58] Field of Search ............................ 204/180 P, 301; 131/143

[56] References Cited

U.S. PATENT DOCUMENTS

| 3,493,488 | 2/1970 | Sisk | 204/301 |
| 3,645,884 | 2/1972 | Gilliland | 204/301 |
| 3,686,089 | 8/1972 | Korngold et al. | 204/180 P |
| 3,755,135 | 8/1973 | Johnson | 204/301 |
| 3,869,376 | 3/1975 | Tejeda | 204/301 |

Primary Examiner—Arthur C. Prescott
Attorney, Agent, or Firm—Watson, Leavenworth, Kelton & Taggart

[57] ABSTRACT

A process for denitrating tobacco with minimal losses of desirable tobacco solubles employing electrodialysis is disclosed. The process comprises subjecting an aqueous tobacco extract to membrane electrodialysis such that nitrate salts are extracted, without substantial loss of desirable tobacco solubles. The denitrated extract when combined with denitrated insoluble fibrous tobacco materials may be employed to produce tobacco products having reduced nirogen oxide delivery.

12 Claims, 3 Drawing Figures

METHOD FOR DENITRATION OF TOBACCO EMPLOYING ELECTRODIALYSIS

BACKGROUND OF THE INVENTION

1. Field of the Invention

This invention relates to a method for denitrating tobacco to effect a reduction in delivery of nitrogen oxides in tobacco smoke, wherein the tobacco is denitrated via electrodialysis.

2. Description of the Prior Art

Tobacco contains a number of nitrogen containing substances which during the burning of the tobacco yield various components in the smoke. Removal of some of these smoke components, such as the oxides of nitrogen, is considered desirable.

Nitrate salts, such as potassium, calcium and magnesium nitrates, are a major class of nitrogenous substances which are precursors for nitrogen oxides, especially nitric oxide. These nitrate salts are normally found in great abundance in burley tobacco stems and strip and to a lesser degree in flue-cured tobacco stems and in reconstituted tobaccos which utilize these components. Attempts have been made to reduce or remove the nitrate from these tobaccos to bring about a significant reduction in the oxides of nitrogen delivered in their smoke. Among the techniques which have been employed to this end are extraction methods whereby the nitrates are removed from the tobacco material.

In accordance with extraction techniques, tobacco materials are generally contacted with water. In this manner, an extract containing the tobacco solubles including the nitrate salts, is formed. The extract is collected and may be discarded or may be treated to remove the nitrate ions. The denitrated extract may thereupon be reapplied to the fibrous insoluble tobacco material from which it was originally removed.

For example, U.S. Pat. Nos. 4,131,118 and 4,131,117 describe denitration of an aqueous tobacco extract by crystallizing the nitrate as potassium nitrate followed by reapplication of the denitrated extract to the tobacco. In U.S. Pat. No. 3,847,164 denitration of tobacco extracts is effected by means of ion-retardation resins which retard ionic material, specifically potassium nitrate, while non-ionic constituents in the tobacco extracts pass unaffected. In the practice of this method rapid neutralization of the resins results, necessitating plant shutdown for regeneration employing costly chemical treatments.

In addition to denitration, extraction processes are employed to remove other components from tobacco. For example, U.S. Pat. No. 3,616,801 describes a process for improving the tobacco burn properties, smoke flavor and ash by controlling the ion content of the tobacco. In accordance with the process therein disclosed the proportion of metallic ions in an aqueous tobacco extract is adjusted, followed by reapplication of the treated extract to the tobacco. Among the treaments suggested for adjusting the metal ion content are ion exchange and membrane electrodialysis. Removal of potassium ions and their replacement with ammonium, hydrogen, calcium or magnesium ions are particularly desirable in the practice of this process. Other ions, including nitrate, may also be removed to improve the tobacco properties. In Example 6, substantial quantities of various tobacco solubles, including both nitrate and potassium ions, were removed by means of electrodialysis.

It has now been discovered that if nitrate is removed from tobacco extract by means of a controlled electrodialysis technique a substantial reduction in nitrate salts is achieved with minimal loss of other tobacco solubles.

SUMMARY OF THE INVENTION

The present invention provides a method for maximizing the removal of nitrates from tobacco extracts, while minimizing the removal of other desirable tobacco solubles. In accordance with the present invention, an aqueous tobacco extract having a solids content of about 5–50% and a resistivity of about 8–50 ohm-cm is rapidly circulated through the alternate cells of an electrodialysis unit which comprise an anion permeable membrane toward the anode spaced no more than about 0.04 inches from an anion impermeable membrane toward the cathode while circulating brine in the remaining cells and applying about 0.5 to about 2.0 volts/cell pair, thereby selectively extracting the nitrate salts into the brine cells, without substantial removal of other tobacco solubles. The thus treated extract may then be applied to fibrous tobacco materials from which the tobacco solubles have been extracted. Smoking tobacco products containing tobacco which has been treated in this manner deliver substantially reduced levels of nitric oxide during combustion.

DETAILED DESCRIPTION OF THE INVENTION

In accordance with the present invention denitration of tobacco extracts is effected by means of membrane electro-dialysis. By selection of the appropriate electrodialysis conditions, substantial removal of nitrate salts from tobacco material may be effected, with minimal removal of other solubles present in the tobacco material. By means of this method substantial reduction in nitrogen oxide delivery by tobacco smoke is achieved efficiently in a commercially feasible manner with minimal effects on other characteristics of the tobacco material.

In the practice of the process, an aqueous tobacco extract which contains 5–50% solids content, and a resistivity of 8–50 ohm-cm, is formed. An extract containing 10–30% solids and having a resistivity of 10–30 ohm-cm is preferred. Conventionally, such an extract may be produced by contacting a tobacco material with an aqueous solution in order to extract the soluble components, including nitrate salts. The aqueous solution employed may be water or preferably a denitrated aqueous extract of tobacco containing tobacco solubles. The extraction can be effected using 5:1 to 100:1 aqueous solution to tobacco ratio (w/w) at 20°–100° C., preferably 60°–95° C., generally for a period of time ranging from a few seconds to several minutes depending on the particular temperature and volume of water or soluble used, although longer periods may be employed.

The aqueous tobacco extract is separated from the insoluble fibrous tobacco residue, employing conventional solid-liquid separation techniques. For example, pressing, centrifugation and filtration techniques may be employed. In general, to maximize the extraction of nitrate salts, the wetted tobacco is pressed or centrifuged, at the end of the extraction time to remove the excess water and residual nitrate salts that may be present on the tobacco surface and in suspension. By employing this mode of operation the need for excessive drying of the tobacco to remove excess moisture can also be avoided.

If necessary the separated tobacco extract is treated to achieve the desired solids content and resistivity. Thereupon, the extract is subjected to electrodialysis employing conditions such that maximum removal of nitrate salts with minimal removal of desirable tobacco solubles is effected in a commercially practical manner. The conditions required to effect selective removal of nitrate salts with minimal removal of other solubles from the extract are fully described hereinbelow. As a general rule, however, electrodialysis in accordance with the present invention entails rapid circulation of the extract through electrodialysis cells comprising closely spaced anion permeable and anion impermeable membranes while applying a low voltage.

Following the electrodialytic denitration of the tobacco extract, the extract is recombined with the insoluble tobacco material from which it was removed. Where the potassium ions, as well as nitrate ions, have been removed from the extract, it is preferable to restore the potassium level by addition of a potassium salt, other than potassium nitrate, prior to reapplication to the tobacco in order to maximize the reduction of nitrogen oxide delivery during combustion. Alternatively, such potassium salts may be added directly to the extracted tobacco. Among the potassium salts suitable for this purpose are potassium phosphate, acetate, citrate, malate and carbonate.

Prior to reapplication the extract may be concentrated if necessary or desired. This may be accomplished by evaporation methods, such as thin film flash evaporation, reverse osmosis or ultra-microfiltration, as well as other conventional concentration techniques. The reapplication may be effected by any suitable means such as spraying, coating, dipping or slurry processes. Following reapplication the tobacco may be dried or otherwise processed to put it in condition for use in tobacco products. Thereupon treated tobacco may be used in any smoking tobacco product desired. Any such smoking tobacco product will exhibit reduced delivery of nitrogen oxides during combustion.

In a membrane electrodialysis set-up, the membranes are arranged in stacks which are disposed between an anode and a cathode. By selection of the appropriate sequence of membranes, the nitrate ions in the extract can be removed either as potassium nitrate or selectively as $NO_3^-$, leaving the potassium ions substantially intact.

The stacks which may be employed in the practice of the present invention comprise anion permeable or neutral membranes alternating with cation permeable or bipolar membranes to form alternate brine and extract cells. The permeable membranes alternately concentrate and dilute the ionic species (particularly $K^+$ and $NO_3^-$) in the tobacco extract in contact with them. The membranes are separated by spacers which are designed and manifolded to provide uniform flow distribution of tobacco extract.

The tobacco extract flows through those alternate cells which have an anionic or neutral membrane (A) toward the anode and a cationic (C) or bipolar membrane toward the cathode, while the extracting medium or brine flows through the remaining cells. The brine is thus confined between an anion impermeable membrane toward the anode and an anion permeable membrane toward the cathode.

The anions present in the tobacco extract cells, specifically the nitrate ions, migrate toward the anode upon imposition of an electric potential. Since the brine cells into which the nitrate ions migrate have an anion impermeable membrane toward the anode, the nitrate ions remain and are concentrated in the brine cells and can thus be removed from the system. Potassium ions may migrate in a similar manner toward the cathode upon imposition of an electrical potential if a cation permeable membrane is employed. On the other hand, the potassium ions will be retained in the tobacco extract when a potential is applied if an impermeable bipolar type membrane is employed.

Figure 1:
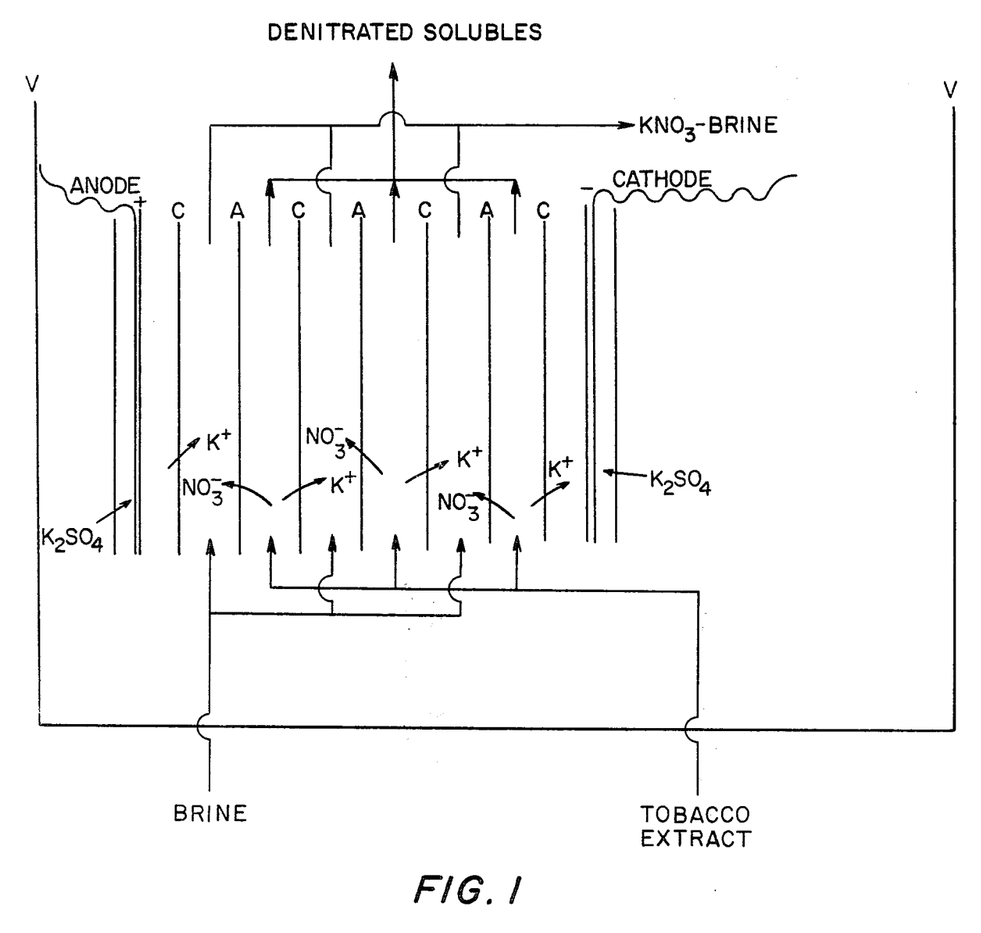
FIG. 1 is a schematic diagram of an electrodialysis stack for selectively removing nitrate salts from tobacco extracts.

FIG. 1 is a schematic diagram of an electrodialysis stack in vessel V which may be utilized in the practice of the present invention and in which a cation permeable membrane and $K_2SO_4$ electrolyte are employed.

The electrodes employed in the electrodialysis unit may be carbon, stainless steel, platinum, or other type of non-corrosive conductive material that does not react with the electrolyte and does not introduce metallic ions in solution, especially polyvalent ions such as $Cu^{++}$ and $Al^{+++}$, that may react with the ionic membrane or with the tobacco solubles and cause membrane fouling and/or scaling on the membrane surface. Preferably hastelloy carbon cathode plates and platinized columbium anode plates are employed.

The solutions in the electrode cells may be different for the anode and the cathode, but preferably are the same. These electrolyte solutions should comprise an approximately 0.1 N solution of an alkali metal salt, preferably a potassium salt of an anion that will not react and will create minimum gas at the electrodes or of an anion that will not foul the membranes nor precipitate polyvalent cations such as $Ca^{++}$, $Mg^{++}$, $Al^{+++}$, and the like on the surface of the membrane. In this connection, regard should be given to the pH that is being used. Electrolytes that are particularly preferred are those containing potassium acetate or sulfate and having a pH of about 2-5 by adding $H_2SO_4$, acetic acid or the like.

The purpose of the electrolyte solution is three-fold, namely to increase and maintain the conductivity of the solution, to cool the electrodes and make them more efficient conductors, and to remove the hydrogen bubbles that accumulate on the electrode surfaces. The electrolyte is continuously recirculated to an electrolyte container which is vented to allow hydrogen gas to escape thereby preventing the gas from being recirculated to the electrodes. To assist in preventing recirculation of dissolved hydrogen or accumulation of gas (hydrogen) bubbles on the electrodes a non-ionic wetting agent, such as glycerine, Triton X-100 or the like may be employed. In addition, circulation of the electrolyte at a rapid rate will facilitate removal of oxygen or hydrogen gas bubbles from the electrodes.

The membranes employed to isolate the electrodes may be of the same nature and thickness as those used in the overall stack. However, these membranes are preferably thicker, more ionic and tighter (less porous). Also, the spacers that are placed between the electrodes and the anode-cathode membranes may be of the same thickness as those used in the overall stack, but preferably they should be thicker, i.e., about twice the thickness of the remaining spacers to allow a greater circulation ratio of electrolyte on the surface of the electrodes.

The brine solution will typically be aqueous. It is preferable that a small concentration of ionic material be present in the brine during the initial phase of operation in order to create some conductivity. Thus, for example, the brine may initially be seeded to 0.1 weight percent potassium or sodium nitrate, chloride or acetate, or nitric, hydrochloric, or acetic acid or with potassium or sodium hydroxide. In general the initial seeding of the brine to about 0.1 weight percent should be made with ions that are water soluble and will not affect the membranes. The brine may be recirculated through the system until the extraction of nitrate ions thereby is no longer efficiently effected.

The anion permeable membranes may be neutral or ionic membranes having a positive fixed electrical charge. Positively charged membranes which will attract and pass anions and repel cations and are thus anion permeable. Cation permeable membranes are negatively charged and will attract and pass cations and repel anions. Neutral membranes will allow either anions or cations to pass through when a voltage is applied across the ionic solution that is confined between such membranes.

Bipolar type membranes are cation and anion impermeable membranes which contain positively charged groups on one face and negatively charged groups on the other. When these membranes are placed such that the membrane surface which contains the negatively charged groups is toward the cathode and the positively charged surface is facing the anode, the anions which are attracted towards the anode are repelled by the negatively charged membrane surface and the cations which are attracted toward the cathode are repelled and neither ion is allowed to pass through. Bipolar type characteristics can be achieved with a single membrane or two membranes, one anionic and one cationic, can be placed directly against each other to simulate a bipolar membrane.

In the practice of the present invention membranes should be employed which not only have the appropriate cation or anion selectivity, but which also have a tightness sufficient to minimize transfer of nonelectrolyte substances. Membrane tightness is a term used to describe membranes according to the amounts of nonelectrolyte substances that are transferred or accompany the ionic transfer during electrodialysis. This parameter is controlled during membrane manufacture by adjusting average pore sizes or total pore volumes. The effect of pore size in chemical separations of various substances on the basis of molecular weight is well developed and described in microfiltration, ultrafiltration or reverse osmosis technologies. In electromembrane dialysis similar effects are observed, that is, the smaller the average pore size of a membrane, the lower will be the transfer of nonelectrolytes which accompanies ion transfer from one media that contains such substances into another. On the other hand, the larger the average pore size or the total pore volume of a membrane, the less efficient a membrane will be and a greater amount of nonelectrolyte substances will transfer or accompany the ion transfer from one solution into another. Membranes having larger average pore sizes are generally less susceptible to contamination by low molecular weight polyelectrolytes.

Another parameter commonly associated with or indicative of membrane tightness is the water content of the wet resin (membrane). Membranes that contain about $\leq 25\%$ water are considered to be very tight membranes, whereas those membranes that contain about $\geq 50\%$ water are considered to be very loose membranes. Membranes containing intermediate amounts of water are of intermediate degrees of tightness. Those membranes which contain the higher amount of water will allow a greater amount of soluble substances of a given molecular weight to intrude in the membrane matrix, and to reach equilibrium and with such membranes a greater amount of water is transferred with the ionic species into the concentrating stream (brine compartment) when an electrical potential is applied. A greater quantity of nonionic (nonelectrolyte) substances is transferred into the brine or concentrating stream. Such a membrane is classified as loose while a membrane having the same porosity characteristics but containing a lesser amount of water is considered to be a tighter membrane, since a smaller amount of nonelectrolyte substances will dissolve in the water in the membrane matrix of the latter membrane and because a lower amount of water is transferred with the ionic species. In essence then, tight membranes having small pore sizes or volumes and/or low water contents are most effective in minimizing transfer of nonionic tobacco solubles into the brine cells.

The number and dimensions of the cells will depend upon the desired treatment rates, the size of commercially available membranes, the viscosity of the aqueous tobacco solubles and the need to maintain an acceptable flow rate at a pumping pressure below the rupturing point of the membranes. Other factors that determine the number and dimension of cells are the operating voltage, the amount of nitrate in the aqueous tobacco solubles, the solubles temperature, the desired degree of denitration, the resistivity of the membranes and the distance or thickness of the cells, and the desired mode of operation, viz. continuous vs. batch. Generally for a given system (voltage, nitrate level, treatment rate) with thinner, more ionic and smaller spacing between cell membranes, smaller membrane area or fewer cells will be required. Distances of $\leq 0.04$ inches have been found to be highly effective for commercially efficient systems. The same is true when the applied voltage and the solubles temperature increase, with the limiting factors on upper voltages and operating temperatures being the nature of the membranes and spacers. The temperature should be below the critical temperature for the membranes and spacers to avoid damage; the voltage should be such as to avoid electrolysis and minimize transference of other tobacco substances, ionic or non-ionic in nature.

The concentration of the tobacco extract is generally limited on the one hand by flow rate, which depends on the presence of substances that increse the extract's viscosity, and, on the other hand, by efficient denitration, which depends on the concentration of nitrate ions. Concentrations should be kept low enough to avoid membrane deposits and to permit flow without excessive resistance. As a practical manner, viscosity is the upper limit for tobacco extract concentration. At the low end of the range, the power required relative to the degree of deionization becomes the limiting factor. It has been found that tobacco extracts having between 5–50% solids and a resistivity of 8–50 ohm-cm, are suitable for use in the present process. Preferably, extracts having 10–30% solids and a resistivity of 10–30 ohm-cm are treated in accordance with the invention.

The degree to which a solution is demineralized is proportional to the electrical current flowing through the stack. The current is limited by the electrical resistance of the stack components and the maximum voltage which can be applied before overheating occurs. Therefore, in solutions requiring a large amount of salt transfer, it becomes necessary to pass the solution through the stack a number of times (batch operation) or through several stacks in series (continuous) until the average nitrate concentration is reduced to the desired level.

In operation the current density in amps per square centimeter of membrane greatly depends on the ionic strength or resistivity of the tobacco extract, the membranes, the amount of voltage or potential that is being applied, the operating temperature of the stack, the cell thickness, and the resistivity imposed by a certain amount of deposit of tobacco solids on the membranes surface which again depends on viscosity and flow rates. The limiting factors for the desired voltage are the larger capital investment for cells required when the lower voltages are used and the greater transfer of non-ionic species across the membranes, the greater probability of membrane "fouling" and the higher power consumption when the higher voltage is applied. Other limiting factors are cell thickness (spacing between membranes), membrane tightness, resistance, ionic strength of the tobacco solubles and membranes and the operating temperature of the system. Voltages of between about 0.5 and 2.0 volts per cell pair permit efficient and economical denitration of tobacco extracts in accordance with the present invention.

In order to avoid fouling of the membranes by polyvalent cations, such as magnesium or calcium, and their resultant loss from the extract, the pH of the tobacco extract should be kept on the acid side with acids, such as acetic or hydrochloric. By this means water soluble magnesium and calcium salts are maintained in solution, thus preventing the cations from being converted into insoluble hydroxides, carbonates or the like which may deposit on the membrane surface and cause scaling. Thus, chemical fouling may be avoided in the treatment of aqueous tobacco extracts by maintaining the pH of the extract below 7.0, normally 5–6.5, with an acid such as acetic. Alternatively, polyvalent cations and anions and peptides may be precipitated and filtered from the extract prior to applying electrodialysis and recombined with the extract thereafter. Further by rapidly circulating the extract and employing a small membrane spacing and tighter membranes with application of sufficient current (0.5 to 2.0 volts/cell pair) in the present process, the most mobile ions, such as nitrate, are extracted while less mobile ions are flashed out of the cells thereby avoiding their embedding into the membrane pores. Also, the more mobile ions will displace such ions as calcium, magnesium, citrate and the like even from ionic membranes.

If the electrolyte is in a closed loop recirculating stream in an electrodialysis unit set up such as in FIG. 1, it is continuously gaining metallic ions such as $K^+$, $Ca^{++}$, $Mg^{++}$, and the like. It is thus necessary to continuously adjust the pH with an acid, such as $H_2SO_4$, to prevent any precipitation or scaling of $CaSO_4$ or $Ca(OH)_2$, $Mg(OH)_2$ or other polyvalent salt. Also, the ionic strength of the electrolyte solution is thus being increased which necessitates a feed and bleed system. It is desirable from a chemistry of smoke standpoint to retain the metallic ions in the denitrated solubles. Therefore, if the electrolyte solution is a system such as potassium acetate and acetic acid, and/or $K_2SO_4$, $H_2SO_4$, it can be recirculated around the electrodes and continuously bled into the exiting denitrated tobacco solubles, thereby eliminating a waste stream and maintaining the potassium level in the denitrated tobacco solubles.

Figure 2:
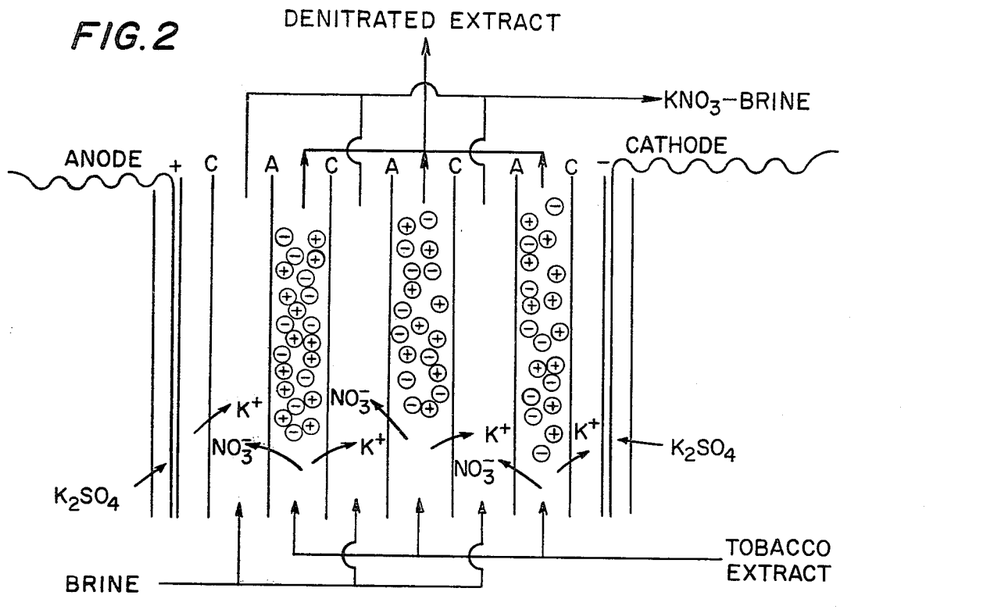
FIG. 2 is a schematic diagram of a membrane electrodialysis stack employing electro-regenerated ion exchange resins.
Figure 3:
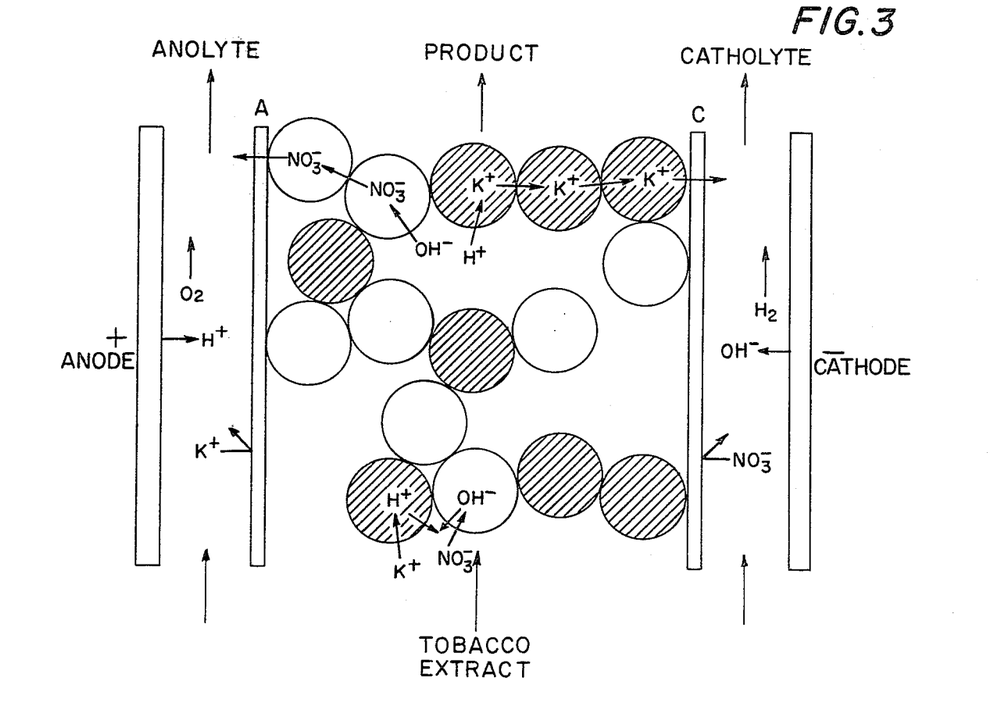
FIG. 3 is a schematic diagram of the mechanism of a cell in an electrodialysis stack employing electro-regenerated ion exchange resins.

When very dilute streams are to be deionized and to reduce membrane fouling and energy requirements, that is, avoid electrolysis, the efficiency of the process is enhanced in a system using ion exchange resins and membrane electrodialysis. This is called electro-regenerated ion exchange deionization. The setup is the same as membrane electrodialysis except for the addition of a mixed bed of weak ion exchange or ionic resins to each cell through which the tobacco solubles are to be passed. The dilute solution of ions to be deionized enters the cells that contain the mixed bed of resins. The ions are "trapped" or picked up by the resins causing an increase in ionic concentration and electroconductivity between the electrodes of the electrodialysis cell and thus a lesser amount of electrical power is required. The applied electrical potential causes the anions to transfer through their respective membranes into the brine cells where they are concentrated and removed. The mixed bed of the weak ion exchange resins is continuously regenerated without interruption and without the use of high amounts of additional chemicals or additional power as is the case with standard ion exchangers. The mixed bed of weak ion exchange resins may be composed of a single resin having both negative and positive groups, two different resins, one anionic and one cationic, in bid or "spacer" type form. The spacer form may be in a basket or wire cloth type weave or in film form (similar to bipolar membranes) specially manifolded to allow flow. FIG. 2 is a schematic diagram of the above-described electro-regenerated ion exchange deionization employing a cation permeable membrane, $K_2SO_4$ electrolyte solutions and cationic+ and anionic− exchange resins. FIG. 3 depicts the mode of operation in a cell of an electrodialysis stack of the type depicted in FIG. 2.

In order to further minimize loss of solubles other than nitrate salts, extraction of the tobacco material may be effected with denitrated tobacco extracts. By means of this expedient it is possible to reduce the amount of non-nitrate materials removed from the tobacco since after several extractions the extract liquor will approach saturation. Thus, except for the nitrates, reduced amounts of materials will be removed during subsequent extraction steps. This is a preferred mode of operation for treating tobacco strip or tobacco components intended for use in reconstituted tobacco.

It is to be understood that the process of the invention may be employed with whole cured tobacco leaf, cut or chopped tobacco, tobacco filler, reconstituted tobacco, tobacco stems and the like. As used herein, references to tobacco and tobacco materials are to be understood to include all such forms of tobacco. Further it is to be understood that the tobacco treated in accordance with the invention exhibits reduced nitrogen oxide delivery in any tobacco product which is consumed by combustion and that references to smoking tobacco products include cigars, cigarettes, cigarillos, etc.

The following examples are illustrative.

EXAMPLE 1

Aqueous tobacco extract containing 46.8% solids and 0.72% $NO_3$-N was diluted 1:1 with water and then denitrated with a membrane electrodialysis unit containing 10 cell pairs. The membranes were 9"×10" with an effective membrane area of 2.5 ft.$^2$. The cells comprised Ionics' 61CZL183 cation permeable paired with 103QZL 183 anion permeable membranes. These anion permeamble membranes are about 0.63 mm thick, contain about 36 weight percent water and comprise crosslinked copolymers of vinyl monomers and contain quarternary ammonium anion exchange groups and are homogeneously film cast in sheet form on a reinforcing synthetic fabric composed of modacrylic polymer. The cation permeable membranes are about 0.6 mm thick, contain about 40 weight percent water and comprise crosslinked sulfonated copolymers of vinyl compounds which are also homogeneously film cast in sheet form on synthetic reinforcing fabrics. The spacers were 0.04". The membranes in front of the electrodes were Ionics' 61AZL-389 which were separated from the platinumniobium, stainless steel electrodes by 0.08" thick spacers. The brine solutions were 0.1% aqueous $KNO_3$ solutions, and the electrolytes were 0.1 N $K_2SO_4$ and $H_2SO_4$ having a pH adjusted to 2 to 4. The electrodialysis was effected for the time periods indicated with application of 7.5 volts. The temperature of the solubles during the runs were not controlled and varied between about 88°–98° C. The pH at 22° C. was about 4.75. The results are set forth in Table 1.

TABLE 1

|  | RUN #1 | | | RUN #2 | | | |
|---|---|---|---|---|---|---|---|
| Treatment Time, Min. | 0 | 30 | 45 | Feed (0) | 0$^1$ | 30 | 55 |
| % Solids | 24.2 | 16.3 | 15.3 | 23.4 | 19.2 | 17.5 | 15.9 |
| % DWB | | | | | | | |
| K$^+$ | 14.5 | 8.0 | 4.8 | 14.5 | 14.6 | 9.1 | 4.9 |
| Ca$^{++}$ | 2.44 | 2.58 | 2.68 | 2.35 | 2.29 | 2.57 | 2.58 |
| Mg$^{++}$ | 1.07 | 1.17 | 1.18 | 1.03 | 1.04 | 1.14 | 1.13 |
| Cl$^-$ | 3.26 | 0.1 | ND* | 3.33 | 3.23 | 0.57 | ND* |
| SO$_4$$^=$ | 2.07 | 1.84 | 1.96 | 2.56 | 3.13 | 2.29 | 1.89 |
| P | 0.66 | 0.74 | 0.65 | 0.68 | 0.68 | 0.74 | 0.63 |
| Total Nitrogen | 4.46 | 3.68 | 3.92 | 4.66 | 4.53 | 3.71 | 4.09 |
| NO$_3$—Nitrogen | 1.53 | 0.104 | 0.02 | 1.54 | 1.46 | 0.13 | 0.02 |
| Total Alkaloids | 2.64 | 2.88 | 3.01 | 2.74 | 2.71 | 2.97 | 3.14 |
| Ash | 38.0 | 25.8 | 19.0 | 36.8 | 37.0 | 25.7 | 20.1 |
| % Reduction (DWB) | | | | | | | |
| Ash | — | 32 | 50 | — | — | 30 | 45 |
| K | — | 44.8 | 66.5 | — | — | 37.1 | 66.2 |
| NO$_3$—Nitrogen | — | 93.2 | 98.7 | — | — | 91.6 | 98.7 |
| Cl$^-$ | — | 100 | 100 | — | — | 82.9 | 100 |
| Solids | — | 32.6 | 36.8 | — | — | 25.2 | 32.1 |

$^1$Feed after recirculation through stack without current on
*ND = not detectable

EXAMPLE II

Electrodialysis of tobacco extract was effected in the manner set forth in Example 1, Run 1, with cation permeable CR62SEM and anion permeable AR204UZL Ionics' membranes. These are tighter membranes than those employed in Example 1. Again temperature was not controlled and varied between about 84°–100° C. The results of this run are set forth in Table 2.

TABLE 2

|  | RUN #3 | | | | | |
|---|---|---|---|---|---|---|
| Treatment Time, Min. | Feed (0) | 0$^1$ | 30 | 60 | 70 | 108 |
| % Solids | 23.3 | 21.7 | 20.3 | 20.0 | 19.0 | 18.5 |
| % DWB | | | | | | |
| K$^+$ | 14.2 | 13.8 | 11.3 | 7.5 | 5.8 | 4.6 |
| Na$^+$ | 0.26 | 0.38 | 0.42 | 0.38 | 0.39 | 0.30 |
| Ca$^{++}$ | 2.32 | 2.26 | 2.36 | 2.30 | 2.53 | 2.38 |
| Mg$^{++}$ | 1.00 | 0.97 | 1.03 | 1.00 | 1.05 | 0.97 |
| Cl$^-$ | 3.39 | 3.41 | 1.82 | 0.50 | <0.5 | ND* |
| SO$_4$$^=$ | 3.00 | 2.76 | 2.46 | 2.00 | 1.05 | 1.08 |
| P | 0.64 | 0.64 | 0.69 | 0.70 | 0.58 | 0.54 |
| Total Nitrogen | 4.55 | 4.56 | 3.89 | 3.5 | 3.79 | 3.95 |
| NO$_3$—Nitrogen | 1.50 | 1.43 | 0.59 | 0.12 | 0.04 | 0.03 |
| Total Alkaloids | 2.70 | 2.67 | 2.81 | 2.80 | 2.74 | 2.76 |
| Ash | 36.5 | 37.3 | 29.6 | 22.0 | 19.5 | 16.2 |
| % Reduction (DWB) | | | | | | |
| Ash | — | — | 19.0 | 39.7 | 46.6 | 55.5 |
| K | — | — | 20.0 | 47.0 | 59.1 | 67.6 |
| NO$_3$—Nitrogen | — | — | 60.7 | 92.3 | 97.3 | 98.0 |
| Cl$^-$ | — | — | 46.3 | 85.2 | >85.2 | 100 |
| Solids | — | — | 12.9 | 14.2 | 18.5 | 20.6 |

$^1$Feed (CEL) after recirculation through stack without current on
*ND = not detectable The conditions during Runs 1 through 3 of Examples 1 and 2 are set forth in Table 3. Both the amount of current passing through the unit and visual inspection indicated that the membranes were not fouling during these runs.

TABLE 3

| | | RUNNING CONDITIONS | | | |
|---|---|---|---|---|---|
| Trial Number | Time Min. | D.C. Current amps | D.C. Volts | Extract Resistivity ohm-cm | Resistivity of Brine ohm-cm |
| | 0 | 2.75 | 7.5 | 15.5 | 830 |
| | 2 | 4.1 | 7.5 | — | — |
| | 10 | 4.6 | 7.5 | — | — |
| 1 | 15 | 4.6 | 7.5 | 20.5 | 29.0 |
| | 30 | 3.8 | 7.5 | 29.5 | 18.5 |
| | 45 | 2.8 | 7.5 | 44.0 | 16.0 |
| | 0 | 2.5 | 7.5 | 16 | 730 |
| | 2 | 3.4 | 7.5 | — | — |
| | 10 | 4.2 | 7.5 | — | — |
| 2 | 15 | 4.4 | 7.5 | 20 | 24 |
| | 30 | 3.8 | 7.5 | 27 | 16 |
| | 45 | 2.9 | 7.5 | — | — |
| | 55 | 2.6 | 7.5 | 45.5 | 14 |
| | 0 | 3.5 | 7.5 | 15.5 | 870 |
| | 2 | 6.1 | 7.5 | — | — |
| | 10 | 8.8 | 7.5 | — | — |
| | 15 | 9.1 | 7.5 | 17 | 15.2 |
| 3 | 30 | 8.9 | 7.5 | 19 | 8.5 |
| | 45 | 7.7 | 7.5 | 23 | 8 |
| | 60 | 6.4 | 7.5 | 26.5 | 7 |
| | 75 | 5.4 | 7.5 | 32 | 7 |
| | 90 | 4.7 | 7.5 | 36 | 6.8 |
| | 108 | 3.9 | 7.5 | — | — |

EXAMPLE III

The tobacco extracts described below were subjected to electrodialysis using an electrodialysis setup as described in Example 1, but having 20 cell pairs. The conditions and levels of denitration of these runs are set forth in Table 4.

TABLE 4

| Run No. | 1 | 2 | 3 | 4 | 5 | 6 |
|---|---|---|---|---|---|---|
| Tobacco Solubles: | | | | | | |
| Volume, cc | — | 8000 | — | — | — | 39,000 |
| Solids, % | 21.6 | 28.1 | 31.6 | 26.2 | 28.6 | 30.2 |
| Temperature, °F. | 93 | 95 | 95 | 95 | 95 | 83 |
| KNO$_3$ (starting), % | 3.75 | 4.55 | 4.91 | 4.69 | 4.76 | 4.18 |

| Run No. | 1 | 2 | 3 | 4 | 5 | 6 |
|---|---|---|---|---|---|---|
| KNO$_3$ (ending), % | 0.29 | 0.28 | 0.32 | 0.19 | 0.27 | 0.29 |
| KNO$_3$ Reduction, % | 92.3 | 93.8 | 93.5 | 95.9 | 94.3 | 93.1 |
| Pumping Press, psi | 24 | 24 | 25 | 24 | 25 | 25 |
| Flow Rate, cc/min. | 2300 | 2400 | 2500 | 2200 | 2500 | 2600 |
| Volts/cell pair | 0.75 | 0.75 | 0.75 | 1.00 | 0.50 | 0.50 |
| Total Volts | 15 | 15 | 15 | 20 | 10 | 10 |
| Time, hours | 4.33 | 5.67 | 5.33 | 3.83 | 10 | 49 |
| Amp-hours | 13.2 | 19.9 | 17.5 | 18.1 | 18.7 | 89.8 |
| KWH/gallon | 0.094 | 0.142 | 0.125 | 0.172 | 0.089 | 0.088 |

As can be seen from Table 4, the power consumption to achieve >90% denitration (<0.04% NO$_3$-N level) of the tobacco solubles ranged from about 0.08 to 0.20 KWH/gallon of tobacco solubles (25–31% solids) depending on the particular voltage and temperature used. However, the lower power levels require a larger membrane area to denitrate a given volume per unit time. An analysis of the brine from Run 4 is set forth in Table 5.

TABLE 5

|  | % (DWB) |
|---|---|
| NO$_3^-$ | 38.1 |
| Cl$^-$ | 6.8 |
| SO$_4^=$ | 2.8 |
| K$^+$ | 35.6 |
| Na$^+$ | 0.5 |
| Mg$^{++}$ | 0.4 |
| Ca$^{++}$ | 1.3 |
| Other (organic, etc.) | 14.5 |
|  | 100.0 |

This brine represents 262.75 g (DWB) of "brine" solids from 1731.2 g (DWB) of tobacco solids of 15.18% "loss" of tobacco soluble solids or 7.6% of tobacco weight since tobacco normally contains 50% soluble solids.

EXAMPLE IV

Tobacco was pulped with water and the extract containing the solubles was separated and concentrated. The extract was partially denitrated in accordance with the crystallization methods of U.S. Pat. Nos. 4,131,117 and 4,131,118. A portion of the resulting extract was thereupon further denitrated by electrodialysis employing a 20 cell pair unit and the conditions of Example 1 whereby the nitrate was removed as KNO$_3$. Half of the resulting denitrated extract was thereupon reapplied to a portion of the tobacco web formed from the extracted pulp and used to form sample cigarettes. A second sample was prepared by adding potassium acetate to the remaining electrodialyzed solubles prior to reapplication to the web. The control sample comprised web treated with the partially denitrated extract.

The results of analyses of these samples is set forth in Table 6.

TABLE 6

EFFECT OF DENITRATION OF RECONSTITUTED TOBACCO ON GAS PHASE IN SMOKE

| Cigarette Filler | | | Gas Phase Analysis by GC of Cigarette Smoke | | | |
|---|---|---|---|---|---|---|
| | | | mg/puff | | | P.C. No. |
| Type | NO$_3$—N % | K % | NO $\times 10^{-2}$ | HCN $\times 10^{-2}$ | CO | Puffs/Cigt. |
| Recon Tobacco DN- | 0.35 | 4.3 | 3.6 | 2.3 | 2.63 | 8 |
| Recon Tob. DN | 0.06 | 2.6 | 1.6 | 4.6 | 2.80 | 10 |
| Recon Tob. (with potassium acetate) | 0.05 | 3.6 | 0.9 | 2.1 | 2.20 | 10 |

The results indicate the effects of denitration on the gas phase smoke constituents. Moreover the results show that restoration of potassium to the denitrated product maximizes the NO reduction and allows additional control of other gas phase constituents in smoke, such as HCN and CO.

EXAMPLE V

Tobacco extract was prepared by soaking 20 pounds of bright stems in 50 pounds of water overnight and expressing about 25 pounds of extract from the soaked stems. Two one gallon samples (3800 cc each) of the extract were subjected to electrodialysis employing a 20 cell pair electrodialysis setup, which was otherwise identical to that employed in Example 1. In Run A, 0.75 volts/cell pair was employed whereas in Run B, 1.5 volts/cell pair were employed. The results of these runs are set forth in Table 7.

TABLE 7

PARTIAL ANALYSIS OF BRIGHT STEM EXTRACT AFTER ELECTROMEMBRANE DIALYSIS

| | | Run Number | | | |
|---|---|---|---|---|---|
| | | A | | B | |
| | Original Extract | Denitrated Extract | % Removed | Denitrated Extract | % Removed |
| Soluble Solids, % | 18 | 15.2 | 15.6 | 15.6 | 13.3 |
| pH | 4.72 | 4.72 | — | 4.70 | — |
| mg/ml | | | | | |
| Na | 0.64 | 0.42 | 34.4 | 0.42 | 34.4 |
| K | 22.49 | 8.44 | 62.5 | 10.02 | 55.4 |
| Cl | 8.35 | <0.1 | ~100 | <0.1 | ~100 |
| Ca | 2.89 | 2.08 | 28.0 | 2.51 | 13.1 |
| Mg | 2.36 | 1.67 | 29.2 | 1.90 | 19.5 |
| NO$_3$—N | 0.23 | Trace | >90 | Trace | >90 |
| Total Alkaloids | 3.86 | 2.61 | 32.4 | 2.92 | 24.4 |
| Total Reducing Sugars | 20.35 | <20 | ? | <20 | ? |
| Total-N | 5.70 | 3.96 | 30.6 | 4.1 | 28.1 |
| Ash | 55.69 | 23.97 | 56.9 | 28.19 | 49.4 |
| P | <0.1 | <0.1 | — | <0.1 | — |
| S | | | | | |
| Treatment Time, Hrs | — | 2.17 | | 1.0 | |
| Total Amps Used | — | 3.76 | | 4.43 | |

Runs A and B show about 13–16% loss of tobacco solubles for 90% NO$_3$-N reduction within 1–2.17 hours. A sample of Run A that had been denitrated by 53.3% was found to have lost only 8.3% of tobacco soluble solids and this 53.3% NO$_3$-N reduction was achieved within one hour. In the case of Run B, 48% NO$_3$-N and 6% soluble solids reductions were achieved within 0.33 hour of treatment.

EXAMPLE VI

Five liters of tobacco solubles containing 19.3% tobacco solids and 0.418% $NO_3^--N$ were denitrated via electro-dialysis in the following manner:

The electrodialysis unit was set up using alternating anion permeable and bipolar membranes to form 15 tobacco extract and brine cell pairs in an alternating pattern. The unit also contained an electrolyte cell at each pole. The electrolyte consisted of 0.1 N $K_2SO_4$ at a pH of 2-4 (adjusted with $H_2SO_4$) and contained a small amount of Triton X-100 (non-ionic wetting agent). The bipolar membranes used in the setup were formed by facing one surface of an anion permeable membrane directly in contact with one of the surfaces of a cation permeable membrane resulting in a single bipolar membrane having a positive charge on the surface facing the anode and a negative charge on the surface facing the cathode.

The unit was 9"×10" with an effective membrane area of 3.75 square feet. The membranes used were Ionics' 103 QZL anion and 61 CZL cation permeable membranes. These membranes were separated by polypropylene spacers 0.04" thick. The membranes in front of the electrodes were Ionics' 61AZL-389 membranes with 0.08" thick polypropylene spacers. A platinum-niobium anode and a strainless cathode were employed.

The tobacco solubles passed through the alternating cells that were located on the cathode side of the individual anion permeable membranes. Although the initial pH of the tobacco solubles was approximately 5, during the run the pH tended to become more neutral to basic. Therefore, to maintain the pH between about 5-6 approximately 71.4 grams of glacial acetic acid was used during the run.

The brine cells were placed in an alternating pattern on the anode side of the individual anion permeable membranes. The brine solution was 0.1% $KNO_3$ having an initial pH of 6.

The temperature of the various solutions (tobacco solubles, brine, and electrolyte) was maintained between 90°-96° F. during the run. The flow rate at 23 psi pumping pressure was set at 1600 cc/minute. When an electrical potential of 2 volts/cell pair was applied, the nitrate ions (and chloride ions) were transported from the tobacco solubles towards the anode. The nitrate and chloride ions passed through the anion permeable membranes into the brine cells where they were retained and concentrated. During the run, the pH of the brine solution decreased from 6 to 1.

The ionic content of the treated extract was analyzed and the results of the analyses are set forth in Table 8.

TABLE 8

| Time (in minutes) | % $NO_3^--N$ | % Reduction | % $K^+$ | % $Ca^{++}$ | % $Mg^{++}$ |
|---|---|---|---|---|---|
| 0 (control) | 0.418 | — | 9.4 | 2.6 | 1.0 |
| 100 | 0.354 | 15.3 | — | — | — |
| 223 | 0.286 | 31.6 | — | — | — |
| 485 | 0.123 | 70.6 | — | — | — |
| 635 | 0.056 | 86.6 | — | — | — |
| 675 | 0.038 | 90.9 | 9.0 | 2.6 | 1.0 |

EXAMPLE VII

A well blended batch of burley tobacco was extracted with hot (90° C.) water using a tobacco/water ratio of 1:25. The wet tobacco was then filtered and pressed under vacuum of 26 psi. The insoluble tobacco residue was allowed to dry at room conditions. The aqueous extract containing the tobacco solubles was concentrated to 15.5% solids and split into two equal portions.

The first portion was then selectively dialyzed employing the conditions and electrodialysis setup of Example VI.

The second portion was non-selectively electrodialyzed employing a membrane electrodialysis unit as in Example I except 20 cell pairs were employed.

A partial analysis of the electrodialyzed solubles was done (Table 9). The electrodialyzed solubles from each portion of tobacco extract were then reapplied by spraying on equal portions of the dry insoluble residue. The sprayed tobacco was then shredded into cigarette filler to produce cigarettes of the same construction and weight.

Control cigarettes of the same construction and weight as the denitrated cigarettes were formed from untreated tobacco from the same blended batch of burley employed in the extraction of the denitration cigarettes.

The results of the analyses of these cigarettes are set forth in Table 10.

TABLE 9

| Electrodialysis Technique | None | Selective $NO_3^-$ Removal | | Non-Selective $NO_3^-$ Removal | |
|---|---|---|---|---|---|
| % DWB | (Control) Original Extract | Denitrated Extract | % Removed | Denitrated Extract | % Removed |
| $NO_3$—N | 1.25 | 0.23 | 81.6 | <0.04 | >96.8 |
| Total-N | 6.2 | 5.8 | 6.5 | 5.5 | 11.3 |
| $Cl^-$ | 1.74 | 0.62 | 64.4 | <0.1 | >99.4 |
| $K^+$ | 10.0 | 9.7 | 3.0 | 5.84 | 41.6 |
| $Ca^{++}$ | 2.8 | 2.8 | 0.0 | 3.2 | — |
| $Mg^{++}$ | 1.07 | 1.07 | 0.0 | 1.06 | 0.9 |

TABLE 10

| Treatment | Tob. Composition | | | Gas Phase Analysis by GC | | | | Redns. in Smoke %/puff | | |
|---|---|---|---|---|---|---|---|---|---|---|
| | $NO_3$—N % | K % | $NO_3$—Redn. % | NO ug/puff | HCN ug/puff | CO mg/puff | P.C. puffs/cigt | NO | HCN | CO |
| None (Burley Control) | 0.50 | 4.45 | — | 51.0 | 13 | 1.23 | 11 | — | — | — |
| Selectively Denitrated Burley by Electrodialysis | 0.16 | 5.77 | 68 | 17.2 | 6.2 | 1.17 | 14.5 | 66.3 | 52.3 | 4.9 |
| Non-Selectively Denitrated Burley by Electrodialysis | 0.04 | 4.25 | 92 | 10.3 | 4.3 | 0.81 | 18.5 | 79.8 | 66.9 | 34.1 |

The data in Table 10 indicates that the denitration of tobacco by electrodialysis reduces such smoke components as NO, HCN and CO. The reductions in NO are practically linear relative to nitrate reduction when the denitration is selective and lesser relative to % NO₃ removed when the denitration is nonselective.

EXAMPLE VIII

The results obtained with the cigarettes tested in Example VII were compared with cigarettes formed from tobacco which had been treated in exactly the same manner, except that the tobacco was more coarsely cut. The results of the analyses of cigarettes containing the coarser filler (15 cuts/inch) and the Table 10 results of the analyses of the cigarettes of Example VII (30 cuts/inch) are compared in Table 11.

TABLE 11

| Tobacco Treatment | Reduction in Cigt. Smoke Components %/puff | | |
|---|---|---|---|
| | NO | HCN | CO |
| 1. Burley control cut at 30 cuts/inch | — | — | — |
| 2. Burley control cut at 15 cuts/inch | 12.2 | 26.2 | 28.5 |
| 3. Selectively denitrated burley by electrodialysis cut at 30 cuts/inch | 66.3 | 52.3 | 4.9 |
| 4. Selectively denitrated burley by electrodialysis cut at 15 cuts/inch | 69.0 | 72.3 | 35.8 |
| 5. Non-selectively denitrated burley by electrodialysis cut at 30 cuts/inch | 79.8 | 66.9 | 34.1 |
| 6. Non-selectively denitrated burley by electrodialysis cut at 15 cuts/inch | 81.4 | 67.7 | 44.7 |

The results indicate that the denitration of burley tobacco by electrodialysis (selective, Samples 3 and 4 or non-selective Samples 5 and 6) reduces such gas phase components from cigarette smoke as NO, HCN and CO. However, when the mode of denitration is selectively carried out for nitrate (only nitrate is primarily removed and no potassium), the % reduction of NO in cigarette smoke is practically linear relative to the % denitration of the filler. In the case of nonselective denitration, the % NO reduction is lower than the degree of denitration. Much greater reductions are achieved in such gas phase smoke components as NO, HCN and CO when denitration is combined with a coarsely cut cigarette filler.

What is claimed is:

1. A method for denitrating aqueous tobacco extracts which comprises circulating an acidic tobacco extract having a solids content of about 5–50% and a resistivity of about 8–50 ohm-cm through the alternate cells of an electrodialysis unit having an anion permeable membrane toward the anode spaced no more than about 0.04 inches from an anion impermeable membrane toward the cathode, said membranes having a tightness sufficient to minimize transfer of nonelectrolyte substances, while circulating brine through the remaining cells and applying about 0.5 to 2.0 volts/cell pair to the unit.

2. The method of claim 1 wherein the tobacco extract cells contain mixed beds of resins selected from the group consisting of ion exchange and ionic resins.

3. The method of claim 1 wherein the aqueous tobacco extract has a solids content of about 10–30% and a resistivity of about 10–30 ohm-cm.

4. The method of claim 1 wherein an electrolyte comprising an acetic acid/acetate solution is employed.

5. The method of claim 1 wherein an electrolyte comprising a sulfuric acid/sulfate solution is employed.

6. The method of claim 4 which further comprises bleeding the electrolyte into the tobacco extract as it exits from the electrodialysis unit.

7. The method of claim 5 which further comprises bleeding the electrolyte into the tobacco extract as it exits from the electrodialysis unit.

8. The method of claim 1 wherein the pH of the circulating tobacco extract is about 5–6.5.

9. The method of claim 1 wherein the brine solution contains up to about 0.1 weight percent ionic material.

10. The method of claim 1 wherein the electrolyte has a pH between about 2 and about 5.

11. A method for denitration of tobacco which comprises:
    (a) forming an aqueous tobacco extract having a solids content of about 5–50% and a resistivity of about 8–50 ohm-cm;
    (b) denitrating the extract by circulation through those cells in an electrodialysis apparatus which comprises an anion permeable membrane having at least intermediate tightness toward the anode spaced no more than about 0.04 inches from an anion impermeable membrane having at least intermediate tightness toward the cathode and which alternate with brine cells in an electrodialysis stack while applying about 0.5 to 2.0 volts/cell pair; and
    (c) combining the denitrated extract with insoluble tobacco residue from which solubles have been extracted.

12. The method of claim 11 wherein the aqueous tobacco extract is formed by contacting a tobacco material with a denitrated aqueous tobacco extract containing tobacco solubles and separating the aqueous extract from the insoluble tobacco residue.

* * * * *